S. R. PERKINS.
Separators for Thrashing-Machines.
No. 143,588. Patented Oct. 14, 1873.
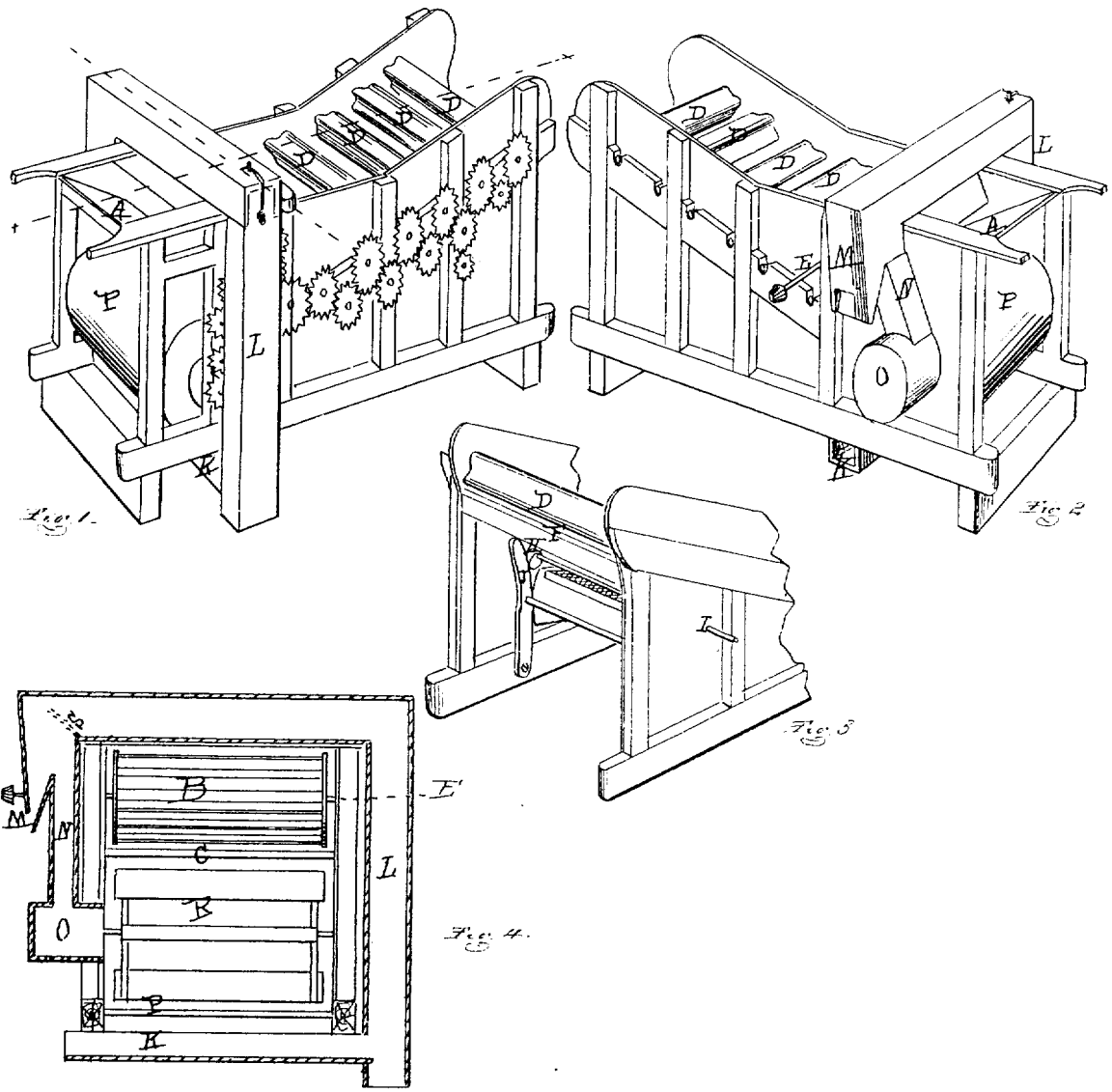
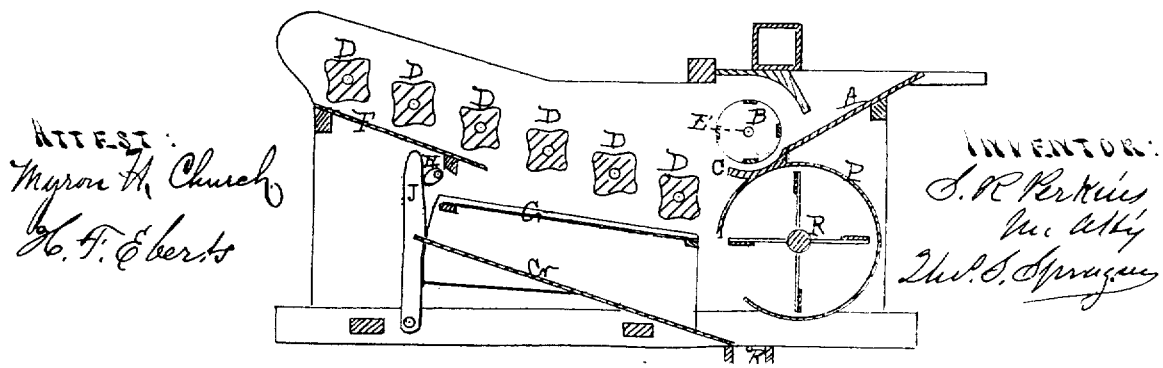

UNITED STATES PATENT OFFICE.

SQUIRE R. PERKINS, OF GREENVILLE, MICHIGAN, ASSIGNOR TO HIMSELF AND THOMAS J. HARRISON, OF SAME PLACE.

IMPROVEMENT IN SEPARATORS FOR THRASHING-MACHINES.

Specification forming part of Letters Patent No. 143,588, dated October 14, 1873; application filed April 21, 1873.

*To all whom it may concern:*

Be it known that I, SQUIRE R. PERKINS, of Greenville, in the county of Montcalm and State of Michigan, have invented a new and useful Improvement in Grain Separators and Thrashers; and I do declare that the following is a true and accurate description thereof, reference being had to the accompanying drawings, and to the letters of reference marked thereon, and being a part of this specification, in which—

Figure 1 shows my invention in perspective. Fig. 2 is a perspective from the opposite side. Fig. 3 is a cross-section vertically on the line *x x* in Fig. 1. Fig. 4 is a perspective from the rear end of the machine. Fig. 5 is a longitudinal vertical section through the center of the machine.

Like letters indicate like parts in each figure.

This invention relates to combined thrashers and separators; and consists, first, in the combination of a fan, a pipe having two mouths, and a tube for separating the grain from the lighter screenings; and, second, in the combination of certain cams and supports J with a shoe, G, as will be fully described hereinafter.

In the accompanying drawings, A represents the feed-bench, B the cylinder, and C the concave, which may be of the ordinary construction. D are a series of stelliform-shaped revolving reels, suitably journaled between the walls of the machine, and driven by means of gearing from the main shaft E. F is a short grain-board, secured between the two sides of the machine, immediately below such of the upper reels as are in the rear of the sieves. G is a shoe provided with suitable sieves, and is so arranged as to receive a slight vibrating motion by means of the cams H secured to the shaft I, and operating against the rear supports J of the shoe. These supports are pivoted at their lower ends, one to each side of the machine, and the shaft I receives motion by means of a suitable pinion from the gearing which drives the reels. The lower end of the shoe terminates in a box, K, which extends under the whole width of the machine, and is provided with a screw-carrier, which may be driven by any convenient attachment. One end of this box is closed, while the other terminates in the vertical leg of the pipe L, the lower end of which is open. This pipe extends across the top of the machine, and terminates in two descending pipes, M N, the former of which is a spout, while the latter terminates in a hollow tube, O, which enters the fan-case P. This fan-case, in which the fan R rotates, receiving motion, by means of a suitable pinion on its shaft, from the main shaft, is made as near air-tight as possible, receiving air only through the hollow tube O.

In the operation of this machine the grain is delivered from the shoe into the box K, and, by the rotation of the conveyer therein, is carried and discharged into the vertical leg of the pipe L, whence the heavy grain falls to the ground. The action of the fan, drawing air as it does through the hollow tube, creates a vacuum in said pipe, and the air, rushing in from the bottom thereof, carries the chaff, chess, and other light material up through said pipe, whence it is discharged through the spout M; a diaphragm, S, being inserted in said pipe to prevent the chaff from passing down through the hollow tube into the fan.

What I claim as my invention, and desire to secure by Letters Patent, is—

1. The combination of the fan R, the pipe L, provided with the spouts M and N, and hollow tube O, all constructed, arranged, and operating substantially as described and shown, for the purposes set forth.

2. The combination of the cams H, the rear supports J, and the shoe G, constructed, arranged, and operated substantially as described and shown.

SQUIRE R. PERKINS.

Witnesses:
HARRY S. SPRAGUE,
MYRON H. CHURCH.